(12) United States Patent
Jing et al.

(10) Patent No.: US 7,743,292 B2
(45) Date of Patent: Jun. 22, 2010

(54) APPARATUS AND METHOD FOR MEMORY CARD TESTING

(75) Inventors: Shin-Tih Jing, Zhubei (TW); Yu-Ling Hou, Hsinchu County (TW)

(73) Assignee: Silicon Motion Inc., Hsinchu County (TW)

( * ) Notice: Subject to any disclaimer, the term of this patent is extended or adjusted under 35 U.S.C. 154(b) by 257 days.

(21) Appl. No.: 12/138,485

(22) Filed: Jun. 13, 2008

(65) Prior Publication Data

US 2009/0313512 A1 Dec. 17, 2009

(51) Int. Cl.
*G11C 29/00* (2006.01)
(52) U.S. Cl. .......................................... 714/719; 714/25
(58) Field of Classification Search .................. 717/105, 717/135; 709/202; 714/718, 733, 735, 719, 714/25

See application file for complete search history.

(56) References Cited

U.S. PATENT DOCUMENTS

| | | | | |
|---|---|---|---|---|
| 6,002,868 A * | 12/1999 | Jenkins et al. | ............... | 717/105 |
| 6,002,871 A * | 12/1999 | Duggan et al. | ............... | 717/135 |
| 7,225,357 B2 * | 5/2007 | Tai et al. | ........................ | 714/25 |
| 7,409,603 B2 * | 8/2008 | Shu et al. | ....................... | 714/45 |
| 2002/0065872 A1 * | 5/2002 | Genske et al. | ............... | 709/202 |

* cited by examiner

*Primary Examiner*—David Ton
(74) *Attorney, Agent, or Firm*—Thomas, Kayden, Horstemeyer & Risley

(57) ABSTRACT

The invention provides a memory card testing apparatus for performing automated operations on memory cards. The memory card testing apparatus comprises a host device, a database, a processing unit and an interface. The host device is provided for accessing a memory card. The database maintains a plurality of test script files to be processed. The processing unit is coupled to the database for selecting a test item from one of the plurality of test script files according to a device identification number corresponding to a target device to be tested and a communication protocol associated with the memory card. The interface is connected to the processing unit and the host device for enabling the host device to execute at least one card command on the memory card according to the test item.

14 Claims, 4 Drawing Sheets

APPARATUS AND METHOD FOR MEMORY CARD TESTING

BACKGROUND OF THE INVENTION

1. Field of the Invention

The invention relates to memory card testing, and more particularly to an automated memory card testing apparatus and methods for reducing testing costs and enhancing overall testing efficiency.

2. Description of the Related Art

With the development of information processing technology, requirement for memory devices have significantly increased. Small-sized memory devices, such as memory cards, which can provide portable convenience, large data storage capacity and efficient access, are now in widespread use.

Due to the increasing demand for memory cards, the testing process, before memory card manufacturing, to ensure the performance and compatibility of the memory cards has increased in economic importance. Therefore, a low cost and highly efficient test for testing memory cards is an important issue for system maker or controller designer.

For conventional memory card testing, testing is conducted manually by human testers step by step, to ensure memory card operation. For example, each memory card needs to be manually inserted or removed by human testers. Further, numerous different testing devices are required during the testing process to ensure the performance and compatibility of the memory cards. As a result, the conventional memory card testing process is not only time consuming, but also costly.

In view of the aforementioned, a need exists to provide an economical and automated testing apparatus for memory cards, which is capable of reducing manpower usage and improving testing efficiency, thereby making the memory card testing process more reliable and economically feasible.

BRIEF SUMMARY OF THE INVENTION

In one aspect of the invention, the invention provides an apparatus for memory card testing. The apparatus for memory card testing comprises a host device, a database, a processing unit and an interface. The host device is provided for accessing a memory card. The database maintains a plurality of test script files to be processed. The processing unit is coupled to the database for selecting a first test item from one of the plurality of test script files according to a device identification number corresponding to a target device to be tested and a communication protocol associated with the memory card. The interface is connected to the processing unit and the host device for enabling the host device to execute at least one card command on the memory card according to the first test item.

In a further aspect of the invention, a memory card testing method is provided. The memory card testing method comprises the steps of: determining a communication protocol associated with a memory card attached to a host device; loading a test script file having a plurality of test items into a processing unit; selecting a first test item from the plurality of test items; sending at least one card command to the host device over an interface according to the first test item; executing the at least one card command on the memory card corresponding to the first test item; obtaining a test result from the memory card; and determining whether the first test item is completed according to the test result and the test script file. Besides, the test script file is generated by recording request packets sent from the target device to the memory card and recording response packets from the memory card in response to the plurality of request packets.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
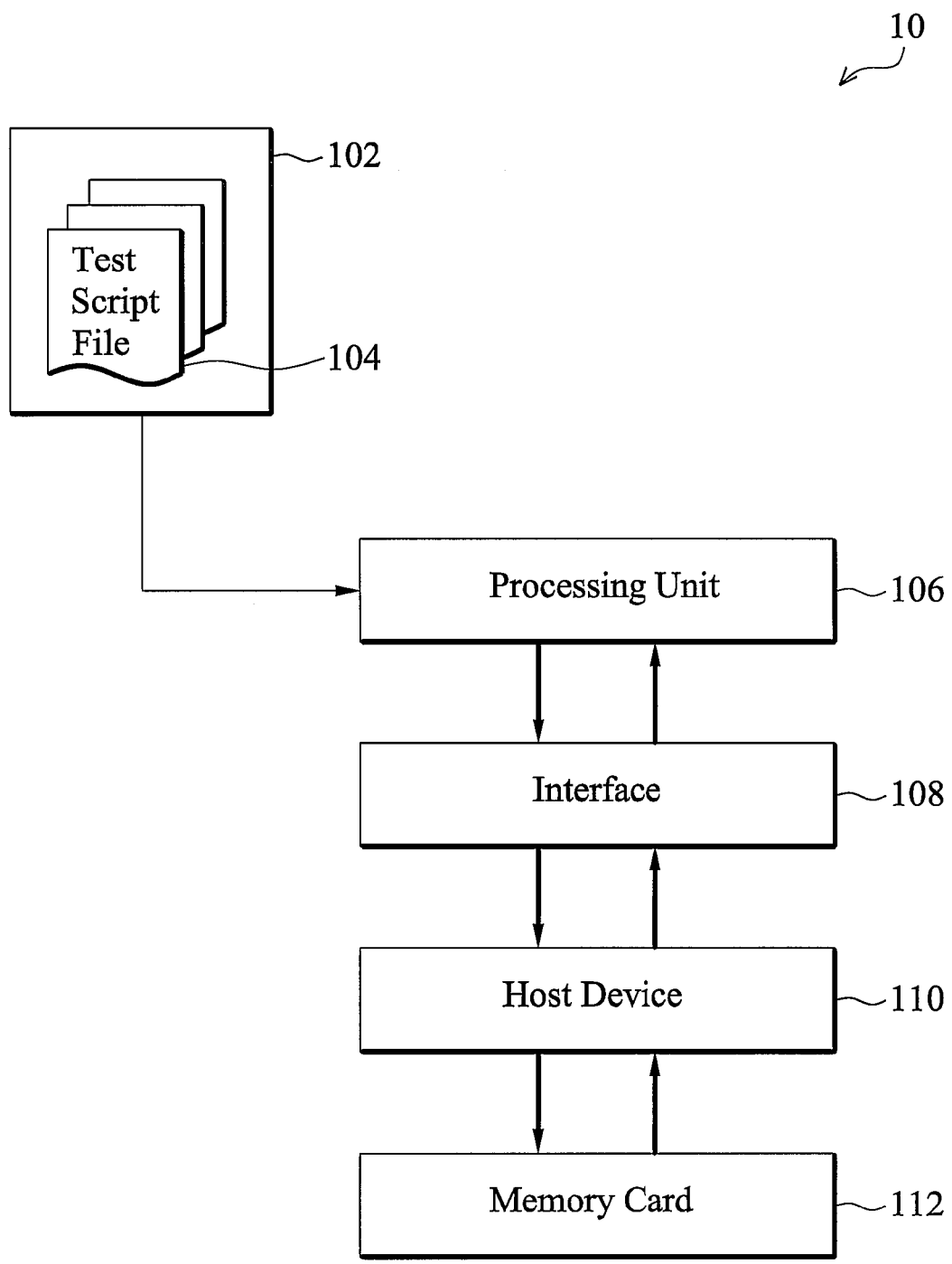
FIG. 1 is a block diagram of an apparatus for memory card testing in accordance with one embodiment of the invention.

FIG. 1 is a block diagram of an apparatus 10 for memory card testing in accordance with one embodiment of the invention. The apparatus 10 comprises a host device 110, a database 102, a processing unit 106 and an interface 108. The host device 110 is provided for accessing a memory card 112. When the memory card 112 is electrically connected to the host device 110, the data stored in the memory card 112 is then accessed by the host device 110 for data transfer according to a communication protocol associated with the memory card 112. In operation, the database 102 maintains a plurality of test script files for every memory card testing case, thereby providing a convenient and rapid manner to improve the memory card testing procedure. In accordance with one embodiment of the invention, each of the plurality of test script files contains a plurality of test items. For example, each test item may indicate a card recognized operation, a format operation, a delete operation, a video recording operation, a hot plug operation or a file play operation. In accordance with one embodiment of the invention, each of test script files is a test item including at least one kind of operation described above. More specifically, a test script file 104 is selected by a device identification number corresponding to a target device to be tested and the communication protocol associated with the memory card 112. The process of generating the test script file 104 as shown in FIG. 1 will be described below in more detail with reference to FIG. 2.

Figure 2:
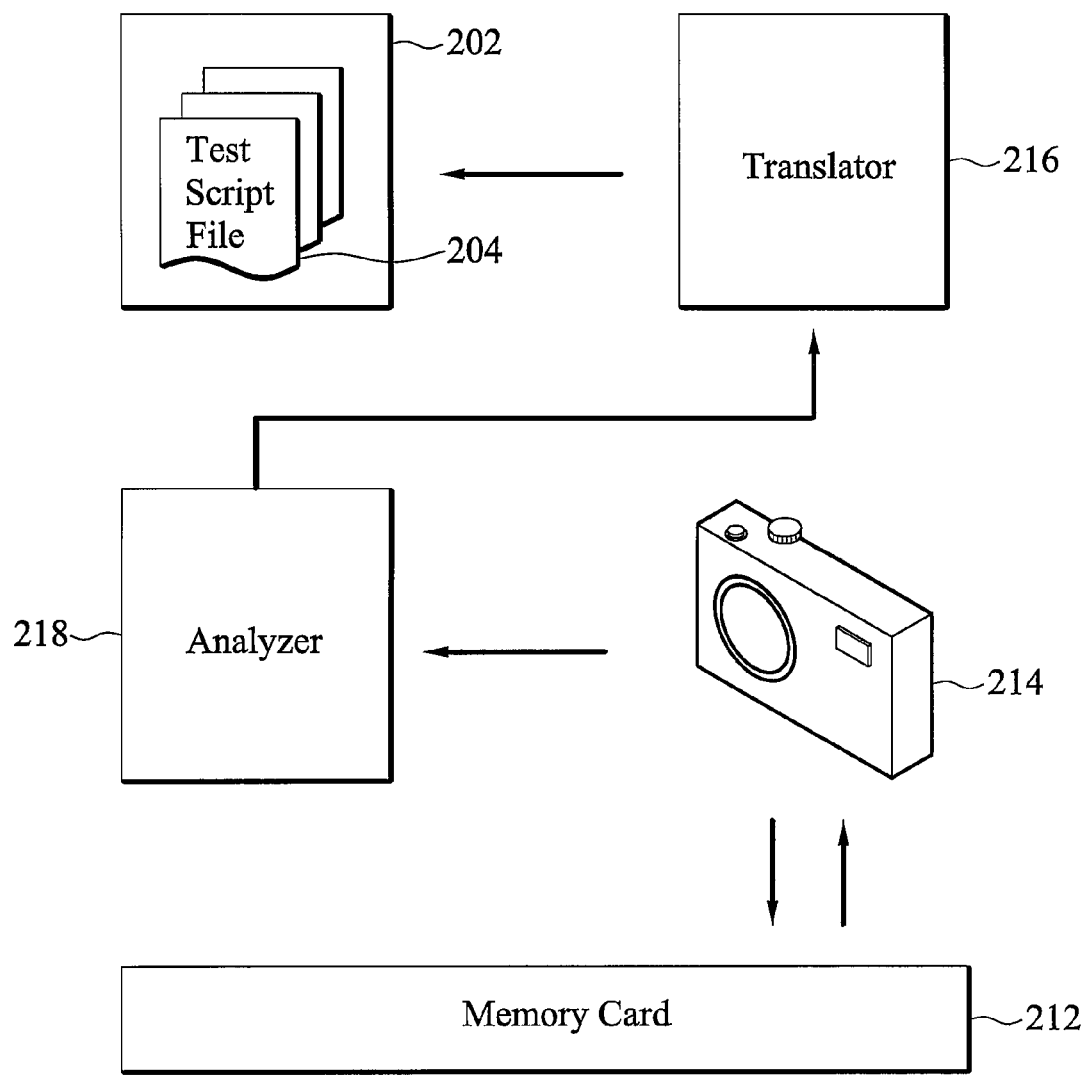
FIG. 2 is a block diagram showing the generation of test script files in accordance with one embodiment of the invention.

FIG. 2 is a block diagram showing the generation of test script files in accordance with one embodiment of the invention. As shown in FIG. 2, an analyzer 218 is provided for recording transactions between the target device, such as a digital camera 214, and a memory card 212. The transactions involve the dispatch of a plurality of request packets sent from a host device (not shown) of the digital camera 214 to the memory card 212. Each of the plurality of request packets contains an operations code defining at least one card command for operating the memory card 212. Also, the transactions involve the receipt of a corresponding plurality of response packets from the memory card 212. Moreover, a translator 216 coupled to the analyzer 218 is utilized for recording operation of a consuming electrical device like a digital camera 214 and providing a specified test script file to a database 202, such as a test script file 204 shown in FIG. 2, where the test script file 204 is transferred with a predetermined format relating to a communication protocol of the memory card 212 and the digital camera 214. The test script file 204 may contain a test item or several test items, and each of test script file could be named by test engineers according to the types of the consuming electrical device. The file name could be deemed as a device identification number.

Referring to FIG. 1, the processing unit 106 is coupled to the database 102 for selecting one or more test items. According to one embodiment of the invention, two test items, such as a first test item and a second test item, selected from the test script file 104 may sequentially indicate a format operation and a video recording operation. Then, the interface 108 between the processing unit 106 and the host device 110 is supplied for enabling the host device 110 to execute the at least one card command on the memory card 112 according to the first test item. In this embodiment, when the first test item corresponding to the format operation is performed, the host device 110 executes one or more card commands sequentially on the memory card 112. At this time, the memory card 112 is inquired to generate a test result with respect to each of the respective one or more card commands. Further, the processing unit 106 compares the test result with the test script file 104. On the basis of the comparison result, it is determined whether the execution of the first test item has failed, passed or been aborted.

For example, when the test result from the memory card 112 is unavailable within a predetermined time period, the first test item is marked with a flag to indicate an aborted result. In addition, when the test result is obtained within the predetermined time period, the processing unit 106 compares the test result with an expected response packet of the test script files 104 for determining whether the execution of the first test item has passed or failed. Then, the second test item corresponding to the video recording operation is automatically performed after the execution of the first test item is determined. Furthermore, the processing unit 106 may load different test script files corresponding to different target devices at the same time according to another embodiment of the invention. In this embodiment, a program or a batch file including a process for executing a number of test script files corresponding to different target devices (e.g., a digital camera, a mobile phone and a portable music player, etc.) is created for testing the memory card 112.

Therefore, the apparatus 10 for memory card testing significantly benefits from performing numerous test items or test script files, without the requirement for manually handling the target devices (such as the digital camera 214 in FIG. 2), and thereby achieves time savings for testing and further increases testing efficiency.

According to one embodiment of the invention, the apparatus 10 for memory card testing may be a personal computer, an embedded system, a personal digital assistant (PDA) and a hand-held mobile phone. Also, it should be appreciated from the foregoing that the interface 108 between the processing unit 106 and the host device 110 employs an universal serial bus (USB) interface, a serial advanced technology attachment (SATA) interface, a general-purpose input and output (GPIO) interface, a peripheral component interconnect (PCI) interface, a peripheral component interconnect-express (PCI-E) interface or an RS232C interface. In operation, according to testing needs, the memory card 112 in FIG. 1 may be a secure digital (SD) card, a multimedia card (MMC), a compact flash (CF) card, a memory stick (MS) card or a solid static disk (SSD) card.

Figure 3:
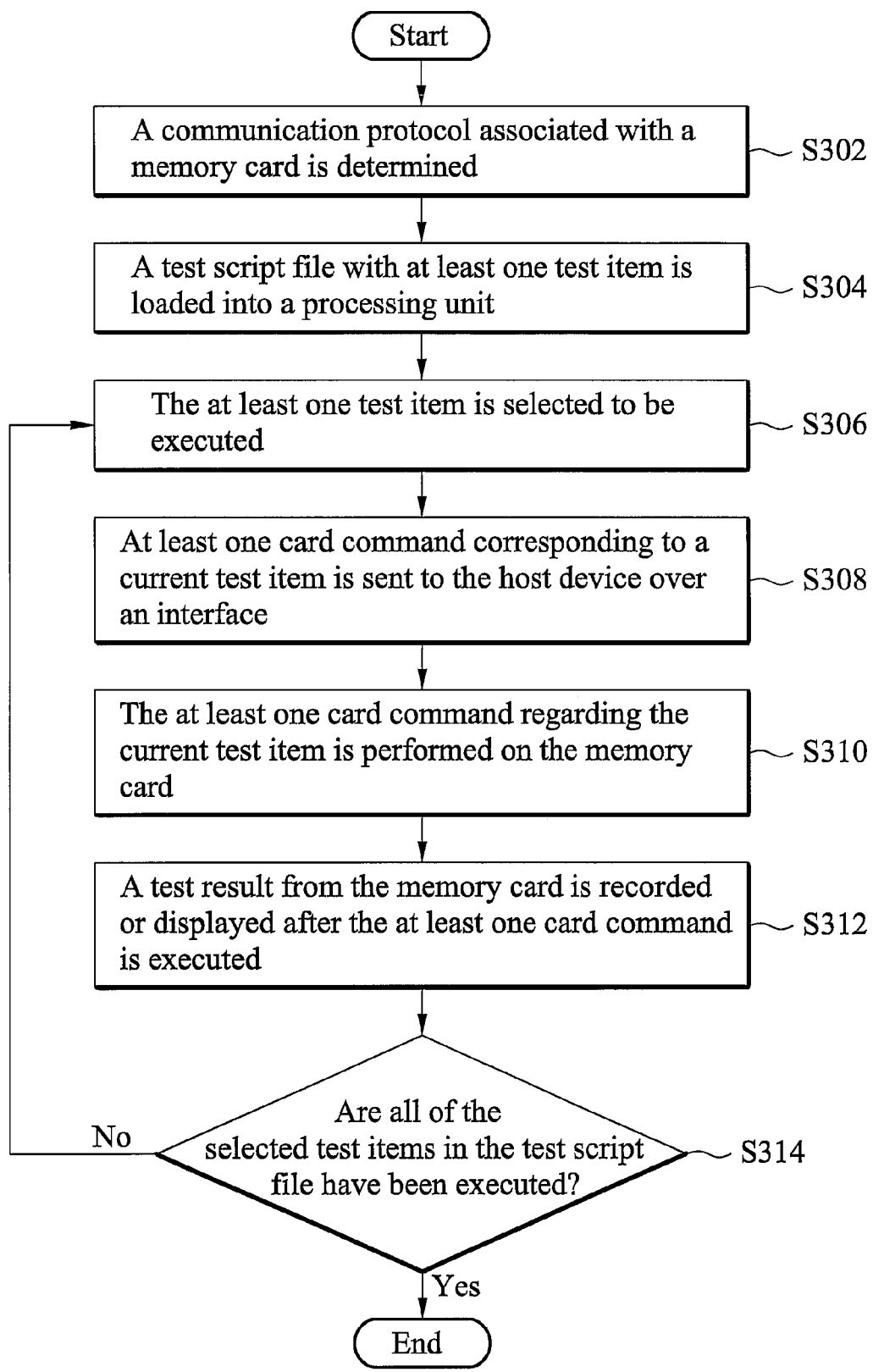
FIG. 3 is a flowchart of a method for memory card testing in accordance with one embodiment of the invention.

FIG. 3 is a flowchart of a method for memory card testing in accordance with one embodiment of the invention. As mentioned above, the process starts with an operation for determining a communication protocol associated with a memory card attached to a host device (step S302). According to one embodiment of the invention, the memory card may be a secure digital (SD) card, a multimedia card (MMC), a compact flash (CF) card, a memory stick (MS) card or a solid static disk (SSD) card. For example, a SD card is plugged into the host device 110, the processing unit 106 could determine/detect the communication protocol (SD protocol) and provide test scripts related to SD cards for selection.

Afterwards, a test script file with at least one test item is loaded into a processing unit according to the communication protocol and a device identification number corresponding to a target device (step S304). Note that the processing unit may be a personal computer, an embedded system, a personal digital assistant or a hand-held mobile phone.

Thereafter, the at least one test item is selected to be executed (step S306). According to one embodiment of the invention, two test items, such as a first test item and a second test item, are sequentially selected and provided for performing a format operation and a video recording operation on the memory card. In this case, after selection of the test items, at least one card command corresponding to a current test item of the selected test items, such as the first test item, is then sent to the host device over an interface (step S308).

Thus, the at least one card command regarding the current test item is performed on the memory card (step S310).

When all processing of the at least one card command for the current test item has been executed, a test result from the memory card is recorded or displayed (step S312). More specifically, the test result is compared with the test script file to determine whether the execution of the first test item has failed, passed or been aborted. Note that the determination operation is substantially similar to the aforementioned embodiment; therefore, further descriptions are omitted for brevity.

Finally, it is determined whether all of the selected test items in the test script file have been executed by the processing unit (step S314). If all of the selected test items have not yet been executed, the same operation as described above is repeated to execute a next test item. If it is determined that all of the selected test items have been executed, the operation of the test script file is finished. As described above, the processing unit may subsequently execute one or more test script files, which correspond to the same communication protocol with the test script file, but associated with different target devices. As a result, the efficiency of memory card testing is enhanced.

It is also noted that the interface between the processing unit and the host device may be an universal serial bus (USB) interface, a serial advanced technology attachment (SATA) interface, a general-purpose input and output (GPIO) interface, a peripheral component interconnect (PCI) interface, a peripheral component interconnect-express (PCI-E) interface or an RS232C interface according to testing necessity.

Figure 4:
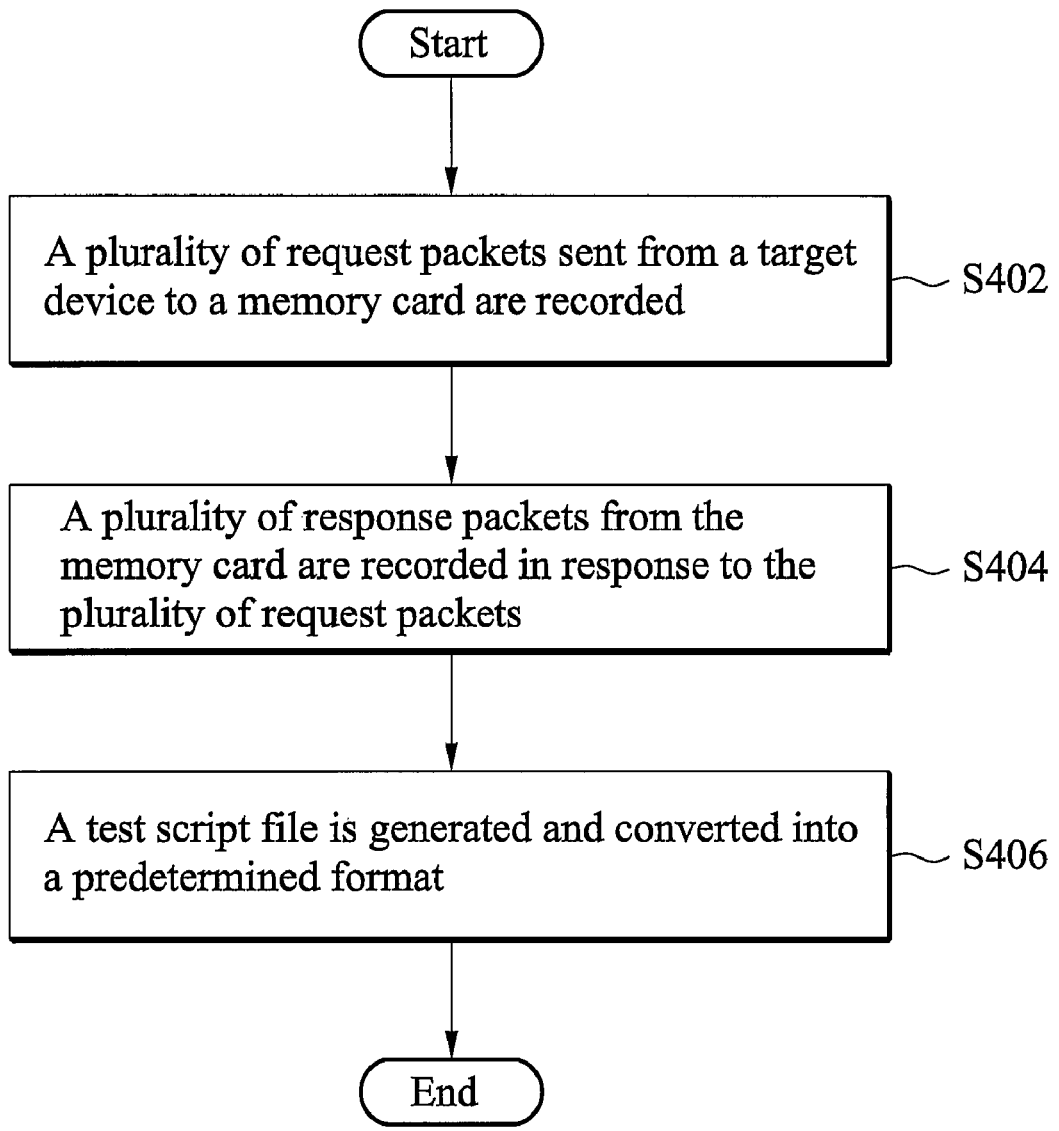
FIG. 4 is a flowchart of operations for generating a test script file in accordance with one embodiment of the invention.

FIG. 4 is a flowchart of operations for generating a test script file in accordance with one embodiment of the invention. First, a plurality of request packets sent from a target device to a memory card are recorded by a recording device, such as an analyzer 218 shown in FIG. 2 (step S402). From the aforementioned description, each of the plurality of request packets comprises an operations code defining the at least one card command for operating the memory card. For example, when a format operation is performed on the memory card of a digital camera, one or more card commands defined by a predetermined request packet are sequentially executed on the memory card. Next, in response to the plurality of request packets, a plurality of response packets from the memory card are subsequently recorded (step S404). In this case, the corresponding response packets contain the information for confirming the format operation. Consequently, a test script file is generated and converted into a predetermined format corresponding to the memory card and the target device (step S406).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for memory card testing, comprising:
a host device for accessing a memory card;
a database for maintaining a plurality of test script files to be processed, wherein one of the plurality of test script files having at least one test item is determined by a device identification number corresponding to a target device to be tested and a communication protocol associated with the memory card;
a processing unit coupled to the database for selecting a test item from the one of the plurality of test script files; and
an interface connected to the processing unit and the host device for enabling the host device to execute at least one card command on the memory card according to the test item,
wherein the processing unit determines whether the test item is completed by comparing a test result from the memory card with the one of the plurality of test script files.

2. The apparatus according to claim 1, further comprising:
an analyzer for recording transactions between the target device and the memory card, wherein the transactions comprises a plurality of request packets sent to the memory card and a plurality of response packets obtained from the memory card in response to the plurality of request packets; and
a translator coupled to the analyzer for generating the one of the plurality of test script files having a predetermined format and the device identification number corresponding to the target device,
wherein each of the plurality of request packets comprises an operations code defining the at least one card command for the memory card.

3. The apparatus according to claim 2, wherein the processing unit further determines whether a predetermined time period has been exceeded to obtain the test result.

4. The apparatus according to claim 3, wherein the processing unit further determines whether the test result matches an expected response packet from the one of the plurality of test script files when the test result is obtained within the predetermined time period.

5. The apparatus according to claim 1, wherein the apparatus for memory card testing is selected from the group consisting of a personal computer, an embedded system, a personal digital assistant (PDA) and a hand-held mobile phone.

6. The apparatus according to claim 1, wherein the interface between the processing unit and the host device is an universal serial bus (USB) interface, a serial advanced technology attachment (SATA) interface, a parallel advanced technology attachment (PATA), a general-purpose input and output (GPIO) interface, a general purpose interface bus (GPIB), an inter-integrated circuit ($I^2C$) bus, a peripheral component interconnect (PCI) interface, a peripheral component interconnect-express (PCI-E) interface or an RS232C interface.

7. The apparatus according to claim 1, wherein the memory card is a secure digital (SD) card, a secure digital high Capacity (SDHC) card, a multimedia card (MMC), an embedded multimedia card (eMMC), a compact flash (CF) card, a memory stick (MS) card, a memory stick Pro (MS Pro) card, a extreme digital (XD) card, an advanced technology attachment (ATA) card, a PCMCIA card or a solid static disk (SSD) card.

8. A method for memory card testing, comprising:
determining a communication protocol associated with a memory card attached to a host device;
loading a test script file having a plurality of test items into a processing unit according to the communication protocol and a device identification number corresponding to a target device;
selecting a test item from the plurality of test items;
sending at least one card command to the host device over an interface according to the test item;
executing the at least one card command on the memory card corresponding to the test item;
obtaining a test result from the memory card; and
determining whether the test item is completed according to the test result and the test script file.

9. The method according to claim 8, wherein the test script file is formed by performing the steps of:
recording a plurality of request packets sent from the target device to the memory card, wherein each of the plurality of request packets comprises an operations code defining the at least one card command;
recording a plurality of response packets from the memory card in response to the plurality of request packets; and
generating the test script file having a predetermined format corresponding to the target device.

10. The method according to claim 9, wherein the step of determining whether the test item is completed comprises:
determining whether a predetermined time period has been exceeded to obtain the test result.

11. The method according to claim 10, further comprising:
determining whether the test result matches an expected response packet from the one of the plurality of test script files when the test result is obtained within the predetermined time period.

12. The method according to claim 8, wherein the method for memory card testing is operable on one of a personal computer, an embedded system, a personal digital assistant and a hand-held mobile phone.

13. The method according to claim 8, wherein the interface between the processing unit and the host device is an universal serial bus (USB) interface, a serial advanced technology attachment (SATA) interface, a parallel advanced technology attachment (PATA), a general-purpose input and output (GPIO) interface, a general purpose interface bus (GPIB), an inter-integrated circuit ($I^2C$) bus, a peripheral component interconnect (PCI) interface, a peripheral component interconnect-express (PCI-E) interface or an RS232C interface.

14. The method according to claim 8, wherein the memory card is a secure digital (SD) card, a secure digital high Capacity (SDHC) card, a multimedia card (MMC), an embedded multimedia card (eMMC), a compact flash (CF) card, a memory stick (MS) card, a memory stick Pro (MS Pro) card, a extreme digital (XD) card, an advanced technology attachment (ATA) card, a PCMCIA card or a solid static disk (SSD) card.

* * * * *